United States Patent
Huang et al.

(10) Patent No.: US 12,321,303 B2
(45) Date of Patent: *Jun. 3, 2025

(54) APPARATUSES, SYSTEMS, AND METHODS FOR PROVIDING COMMUNICATION BETWEEN MEMORY CARDS AND HOST DEVICES

(71) Applicant: SUZHOU BAYHUB ELECTRONICS TECHNOLOGY CO., LTD., Suzhou (CN)

(72) Inventors: Yishao-Max Huang, Suzhou (CN); Xiaoguang Yu, Suzhou (CN); Katsutoshi Akagi, Suzhou (CN); Hongzhang Wang, Suzhou (CN); Zhenlun Allen Li, Suzhou (CN)

(73) Assignee: SUZHOU BAYHUB ELECTRONICS TECHNOLOGY CO., LTD., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,394

(22) Filed: Mar. 14, 2024

(65) Prior Publication Data
US 2024/0220441 A1    Jul. 4, 2024

Related U.S. Application Data

(63) Continuation of application No. 17/684,759, filed on Mar. 2, 2022, now Pat. No. 11,971,838.

(30) Foreign Application Priority Data

Mar. 5, 2021  (CN) .......................... 202110246450.9

(51) Int. Cl.
*G06F 13/42* (2006.01)

(52) U.S. Cl.
CPC ...... *G06F 13/4221* (2013.01); *G06F 13/4234* (2013.01); *G06F 2213/0026* (2013.01)

(58) Field of Classification Search
CPC ............ G06F 13/4221; G06F 13/4234; G06F 13/4282; G06F 2213/0026
See application file for complete search history.

(56) References Cited

U.S. PATENT DOCUMENTS 11,971,838 B2 *  4/2024  Huang ................ G06F 13/4221

FOREIGN PATENT DOCUMENTS

| CA | 2285878 | 5/2000 |
|---|---|---|
| CN | 1936934 | 3/2007 |

(Continued)

*Primary Examiner* — Glenn A. Auve
(74) *Attorney, Agent, or Firm* — Burris Law, PLLC

(57) ABSTRACT

A data transmission apparatus includes: a first port and a second port which are selected by a first control signal; a first signal path and a second signal path which are selected by a second control signal. When a memory card satisfies a first condition, the first control signal selects the first port and the second control signal selects the first signal path, the data transmission apparatus connects the host device and the memory card via the first port and the first signal path and works in a first transmission mode. When the memory card satisfies a second condition, the first control signal selects the second port and the second control signal selects the second signal path, the data transmission apparatus connects the host device and the memory card via the second port and the second signal path and works in a second transmission mode.

20 Claims, 9 Drawing Sheets

(56) References Cited

FOREIGN PATENT DOCUMENTS

| | | |
|---|---|---|
| CN | 110008151 | 7/2019 |
| EP | 0206483 | 12/1986 |
| EP | 0348628 | 1/1990 |

* cited by examiner

APPARATUSES, SYSTEMS, AND METHODS FOR PROVIDING COMMUNICATION BETWEEN MEMORY CARDS AND HOST DEVICES

CROSS-REFERENCE TO RELATED APPLICATIONS

This application is a continuation application of U.S. patent application Ser. No. 17/684,759, filed on Mar. 2, 2022, which claims priority to and the benefit of Chinese Patent Application No. CN202110246450.9, filed on Mar. 5, 2021, the contents of which are hereby incorporated herein by reference in their entirety.

FIELD

The present disclosure relates to the technical field of data transmission, especially to a data transmission system, a data transmission apparatus, and a data transmission method.

BACKGROUND

The statements in this section merely provide background information related to the present disclosure and may not constitute prior art.

With the development of science and technology, many electronic devices are used in our lives and data processing increases accordingly. Therefore, external memory cards are used frequently. In this condition, data information is stored in external memory cards, users can read or write data from or into the external memory card, for example, SD card. SD cards are in constant updating process to improve transmission speed, and different types of memory cards have different transfer protocols. So, the electronic device can adapt to all kinds of SD card and works in the best transfer rate is necessary. For example, the normal SD card works in normal transmission mode and the high-speed SD card works in high-speed transmission mode.

FIG. 1 shows a conventional data transmission system 100. The data transmission apparatus 110 provides communication between normal SD card and/or high-speed SD card and host device 102. As shown in FIG. 1, the data transmission apparatus 110 includes a PCIE switch 1002 and a transfer controller 1006. Wherein the PCIE switch 1002 includes a PCIE-PHY1, a PCIE-PHY2, a PCIE-PHY3 and an analysis module 1004. Specifically, when the memory card 104 supports normal transmission mode, e.g., SD3.X-SD.6.X, the analysis module 1004 determines the transmission mode of the memory card 104 by analyzing a data packet sent from the host device 102. If the memory card 104 is of SD3.X-SD.6.X type which supports normal transmission mode, the analysis module 1004 selects a signal path between the PCIE switch 1002 and the transfer controller 1006 according to physical layer PCIE-PHY1 for performing communication between the host device 102 and the memory card 104. On the contrary, if the memory card 104 is of SD7.X type which supports high-speed transmission mode, the analysis module 1004 selects the signal path between the PCIE switch 1002 and the transfer controller 1006 according to physical layer PCIE-PHY2 for performing communication between the host device 102 and the memory card 104. The PCIE switch in FIG. 1 is very expensive and has a complex circuit design. So, a data transmission apparatus which saves PCIE switch when providing communication between the host device and the memory card of all kinds of type is necessary.

FIG. 2 shows another conventional data transmission system 200 which solves the shortcomings of the highly expensive PCIE switch in FIG. 1. As shown in FIG. 2, the data transmission apparatus 210 includes a PCIE-PHY 202, a transfer controller 204, and a signal selecting module 206. The signal selecting module 206 is configured to receive a signal at a level from a memory card 104 to determine the type of the memory card 104, for example, determining whether the memory card supports a normal transmission mode or a high-speed transmission mode. Specifically, the memory card 104 which supports a normal transmission mode will return a signal at a low level to the data transmission apparatus 210, while the memory card 104 which supports a high-speed transmission mode will return a signal at a high level to the data transmission apparatus 210. The signal selecting module 206 determines the type of the memory card 104 according to the level of the signal sent from the memory card 104. When the memory card 104 supports the normal transmission mode, the signal selecting module 206 connects with the host device 102 via the transfer controller 204 and the PCIE-PHY 202. Otherwise, the signal selecting module 206 connects with the host device 102 directly. As described in FIG. 2, the data transmission apparatus 210 needs at least two signal paths to connect with two interfaces of the host device 102, wherein each signal path (PCIE bus) includes PCIE root complex, the two signal paths connect with two PCIE root complexes in the host device 102. However, the number of PCIE interfaces in the host device 102 used to connect external devices is limited, so saving PCIE interfaces is important.

More important, there are some other shortcomings disclosed in prior art as above. If the memory card 104 is of SD4.X-SD6.X type that supports UHSII mode, the host device 102 communicates with the memory card 104 in UHSI transmission mode, as the host device 102 cannot identify if the memory card 104 supports USHII mode. To solve this problem, the data transmission apparatus disclosed below can support the high-speed transmission mode, the normal transmission mode which includes USHII transmission mode and USHI transmission mode. According to the data transmission apparatus in this invention, the data transmission apparatus performs different transmission modes for different types of the memory cards, which does not increase PCIE switch and saves PCIE interfaces too.

SUMMARY

This section provides a general summary of the disclosure and is not a comprehensive disclosure of its full scope or all of its features.

Disclosed are embodiments of a data transmission apparatus for providing communication between a memory card and a host device. The data transmission apparatus comprises: a first port connected to a control module in the data transmission apparatus, and controlled by a first control signal; a second port connected to a card signal selecting module in the data transmission apparatus, and controlled by the first control signal; a first signal path connected to the control module and the card signal selecting module, wherein the data transmission apparatus implements signal transmission between the control module and the card signal selecting module by the first signal path, wherein a second control signal is used to control the first signal path; and a second signal path connected to the host device and the card signal selecting module, wherein the host device transmits signals to the card signal selecting module by the second signal path, wherein the second control signal is used to control the second signal path. When the memory card satisfies a first condition, the first control signal selects the first port to be turned on, the second control signal selects the first signal path to transmit signals, the data transmission apparatus connects the host device and the memory card via the first port and the first signal path, and the data transmission apparatus works in a first transmission mode. When the memory card satisfies a second condition, the first control signal selects the second port to be turned on, the second control signal selects the second signal path to transmit signals, the data transmission apparatus connects the host device and the memory card via the second port and the second signal path, and the data transmission apparatus works in a second transmission mode.

In other embodiments, a data transmission method for providing communication between a host device and a memory card is provided. The data transmission method comprises: generating, by a data transmission apparatus, a first control signal, and connecting the host device to the data transmission apparatus; wherein the data transmission apparatus generates a second control signal connecting the data transmission apparatus to the memory card; and in response to the memory card satisfying the first condition, the first control signal tuning on a first port and selecting a first signal path according to a second control signal, the data transmission apparatus connecting the host device and the memory card via the first port and the first signal path, and the data transmission apparatus working in a first transmission mode, in response to the memory card satisfying the second condition, the first control signal turning on a second port and the data transmission apparatus selecting the second signal path according to the second control signal, the data transmission apparatus connecting the host device and the memory card via the second port and the second signal path, and the data transmission apparatus working in a second transmission mode.

In another embodiment, a data transmission system which includes a host device, a data transmission apparatus and a memory card is provided. The data transmission system includes: a first control signal configured to control a signal path between the host device and the data transmission apparatus; a second control signal configured to control another signal path between the data transmission apparatus and the memory card; wherein when the memory card satisfies a first condition, the data transmission apparatus works in a first transmission mode, wherein in the first transmission mode, the first control signal selects a first port to be turned on and the second control signal selects a first signal path to transmit signals, the data transmission apparatus connects the host device and the memory card via the first port and the first signal path; and wherein when the memory card satisfies a second condition, the data transmission apparatus works in a second transmission mode, wherein in the second transmission mode, the first control signal selects a second port to be turned on and the second control signal selects a second signal path to transmit signals, and the data transmission apparatus connects the host device and the memory card via the second port and the second signal path.

In another embodiment, a method for switching signal path in a data transmission system is provided. When the memory card is decoupled from the data transmission system, the method for switching signal path includes: a data transmission apparatus maintaining turning on of a first port if the decoupled memory card satisfies a first condition, and a host device connecting with a control module in the data transmission apparatus; and the data transmission apparatus maintaining turning on a second port if the decoupled memory card satisfies a second condition and waiting a period of time before disconnection with the second port and turning on the first port.

Further areas of applicability will become apparent from the description provided herein. It should be understood that the description and specific examples are intended for purposes of illustration only and are not intended to limit the scope of the present disclosure.

DRAWINGS

The features and advantages of embodiments of the claimed subject matter will become apparent as the following detailed description proceeds, and upon reference to the drawings, where like numerals depict like parts, and in which:

Figure 1:
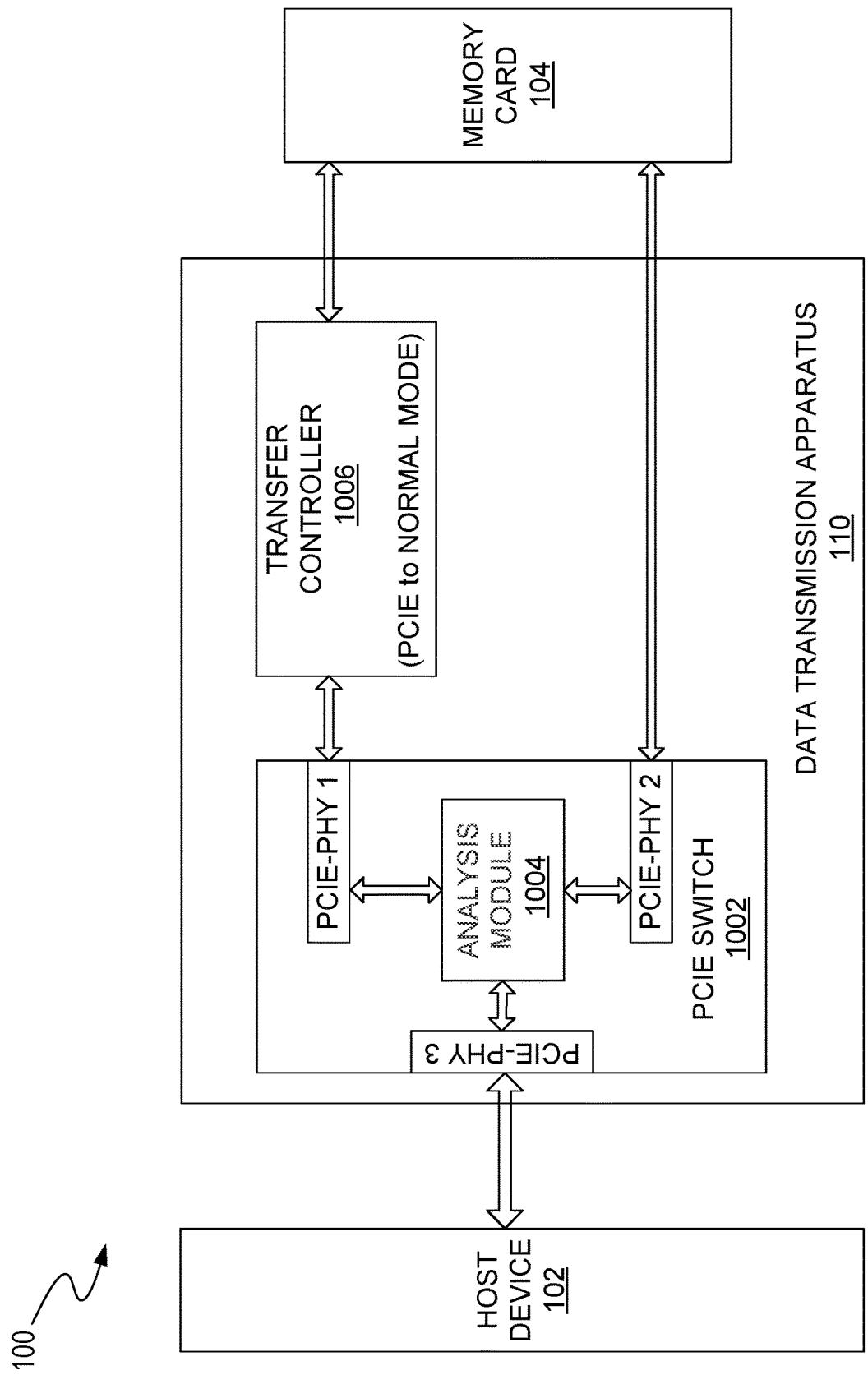
FIG. 1 shows a conventional data transmission system 100.
Figure 2:
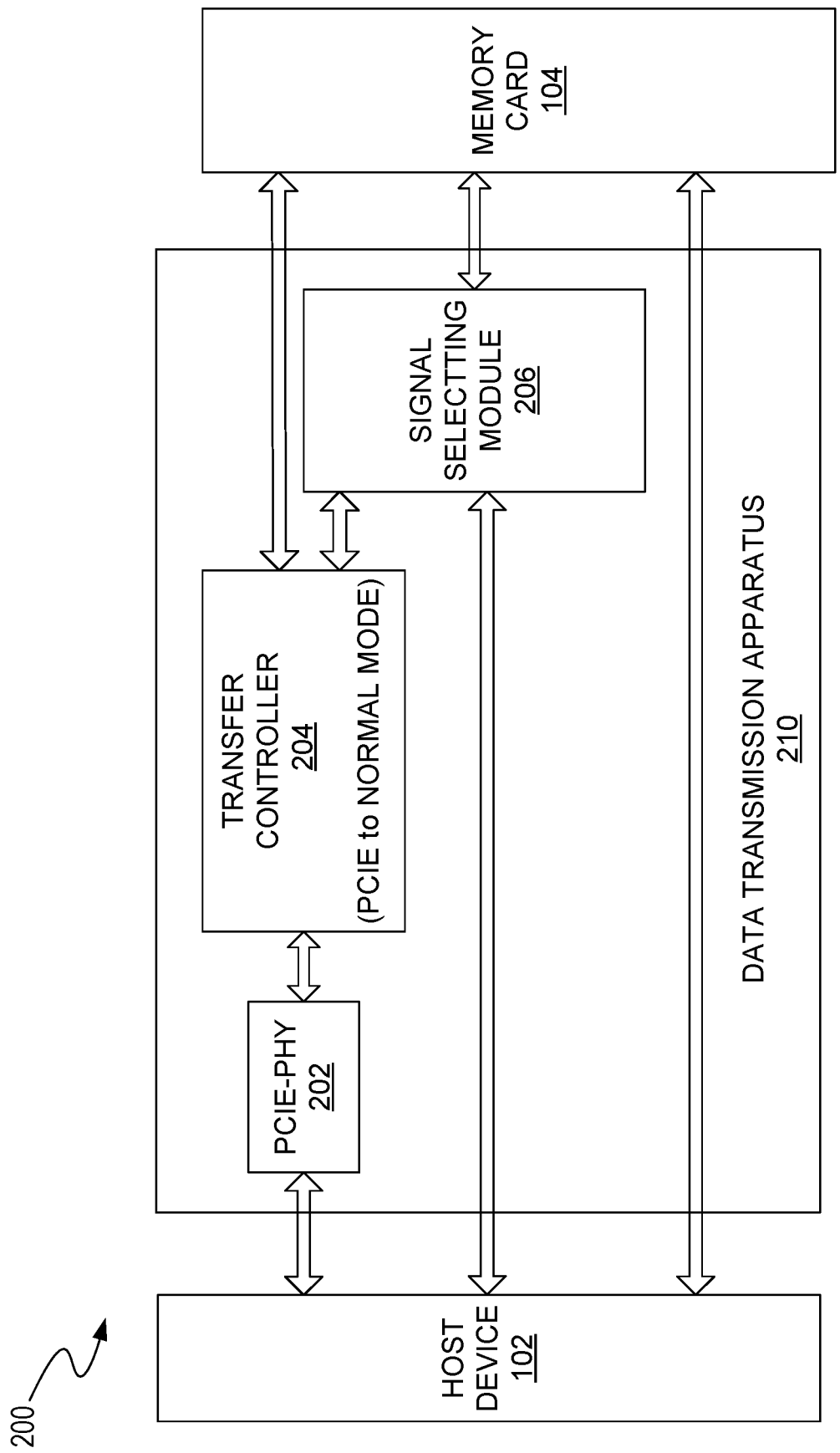
FIG. 2 shows another conventional data transmission system 200.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail to avoid obscuring aspects of the present invention.

Figure 3:
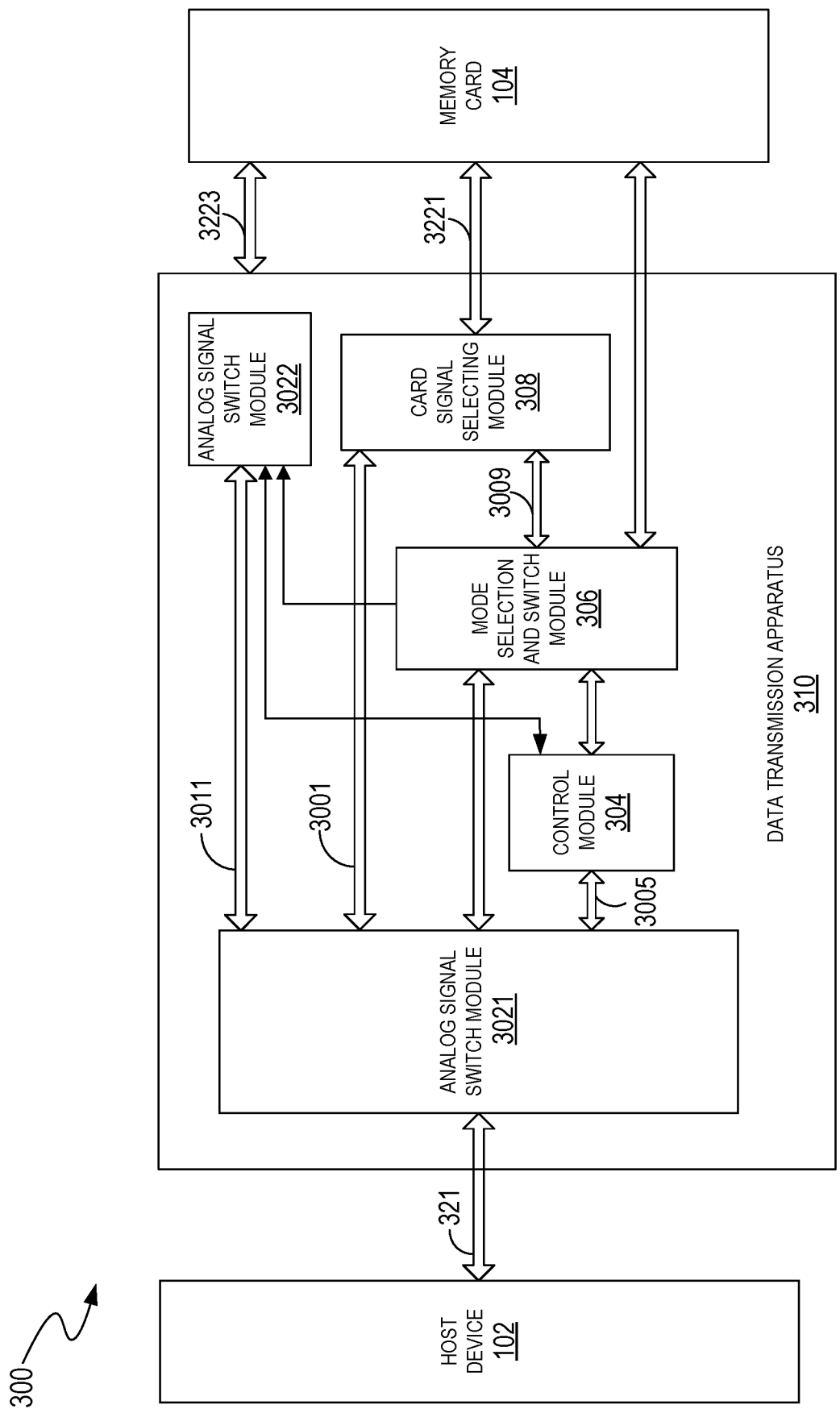
FIG. 3 shows an example of a data transmission system 300 which includes a host device, a data transmission apparatus and a memory card, in accordance with an embodiment of the present invention.

FIG. 3 shows an example of a data transmission system 300 which includes a host device 102, a data transmission apparatus 310 and a memory card 104, in accordance with an embodiment of the present invention. As shown in FIG. 3, the data transmission system 300 includes a host device 102, a data transmission apparatus 310 and a memory card 104. The host device can be, but is not limited to, a host in an electronic device capable of reading data from or writing data to the memory card. By way of example, the electronic device may be a MacBook, PC, digital camcorder, IPAD etc. The data transmission apparatus 310 includes an analog signal switch module 3021, an analog signal switch module 3022, a control module 304, a mode selection and a switch module 306 and a card signal selecting module 308. The memory card 104 can be, but is not limited to, memory card of SD3.X - - - SD7.X type, wherein the memory card of SD3.X - - - SD6.X type supports a normal transmission mode. In other words, the host device 102 communicates with the memory card 104 via the data transmission apparatus 310 in the normal transmission mode which includes UHSI (Ultra High Speed I) transmission mode and UHSII (Ultra High Speed II) transmission mode. UHSI transmission mode and UHSII transmission mode are both named as the normal transmission mode as below. Specifically, the data transmission apparatus 310 communicates with the memory card of SD3.X type in UHSI transmission mode and communicates with the memory card of SD4.X-SD6.X type in UHSII transmission mode. However, the data transmission apparatus 310 communicates with the memory card of SD7.X type in a High-speed transmission mode. In present application, the data transmission apparatus 310 switches transmission mode between the normal transmission mode and the high-speed transmission mode according to the type of the memory card 104 and takes full advantage of the ability of the memory card 104.

The data transmission apparatus 310 in accordance with an embodiment of the present invention can be used as a data transmission chip in a computer and provides communication between the computer and external memory card. The data transmission chip can be a card reader controller. The data transmission apparatus 310 can be used in any electronic equipment that needs data transmission, for example: digital camcorder, mobile phone, computer, etc.

The host device 102 includes an SD card slot which acts as an interface between the host device 102 and the memory card 104. The pins of the SD card connect with pins of the SD card slot and perform data transmission.

As shown in FIG. 3, the analog signal switch module 3021 connects with the host device 102 via a signal path 321. The signal path 321 can be a PCIE (peripheral component interconnect express) bus. In one embodiment, the analog signal switch module 3021 is a high-speed multiplexer (MUX). It should be understood by the person having ordinary skill in the art that the analog signal switch module 3021 can be another device which can perform the function of MUX. The analog signal switch module 3021 connects with the control module 304 via a signal path 3005, and the card signal selecting module 308 selects a signal path 3009 to communicate with the mode selection and switch module 306 when the memory card 104 supports the normal transmission mode. The data transmission apparatus 310 works in a first transmission mode when the memory card supports normal transmission mode. The analog signal switch module 3021 selects a signal path 3001 to connect with the card signal selecting module 308, the analog signal switch module 3021 connects with the analog signal switch module 3022 via a signal path 3011, and the analog signal switch module 3022 connects with the memory card 104 via a signal path 3223 when the memory card supports a high-speed transmission mode, wherein the analog signal switch module 3021 and the analog signal switch module 3022 are both the same MUX modules. The data transmission apparatus 310 works in a second transmission mode when the memory card supports the high-speed transmission mode. In one embodiment, the card signal selecting module 308 which is a low-speed MUX connects to the memory card 104 via the signal path 3221, is configured to select the signal path 3001 or the signal path 3009.

Specifically, the level of the response signal from the memory card 104 is a high level when the memory card 104 supports the normal transmission mode, it is also referred to as that the memory card 104 satisfies a first condition. On the other hand, the level of the response signal from the memory card 104 is a low level when the memory card 104 supports the high-speed transmission mode, it is also referred to as that the memory card 104 satisfies a second condition. Wherein the response signal sent from the memory card 104 is triggered by a command signal sent from a control module 304, it will be described in FIG. 4 as below.

As disclosed above, the data transmission apparatus 310 provides communication between the host device 102 and different types of memory card 104, in accordance with an embodiment of the present invention. The card signal selecting module 308, and the analog signal switch modules 3021 and 3022 select corresponding signal paths to transmit data which solves the problem of high cost of PCIE switch in conventional technology and solves the problem of using two PCIE paths. The data transmission apparatus 310 improves transmission efficiency and decreases the cost of providing communication between the host device and the memory card accordingly.

Figure 4:
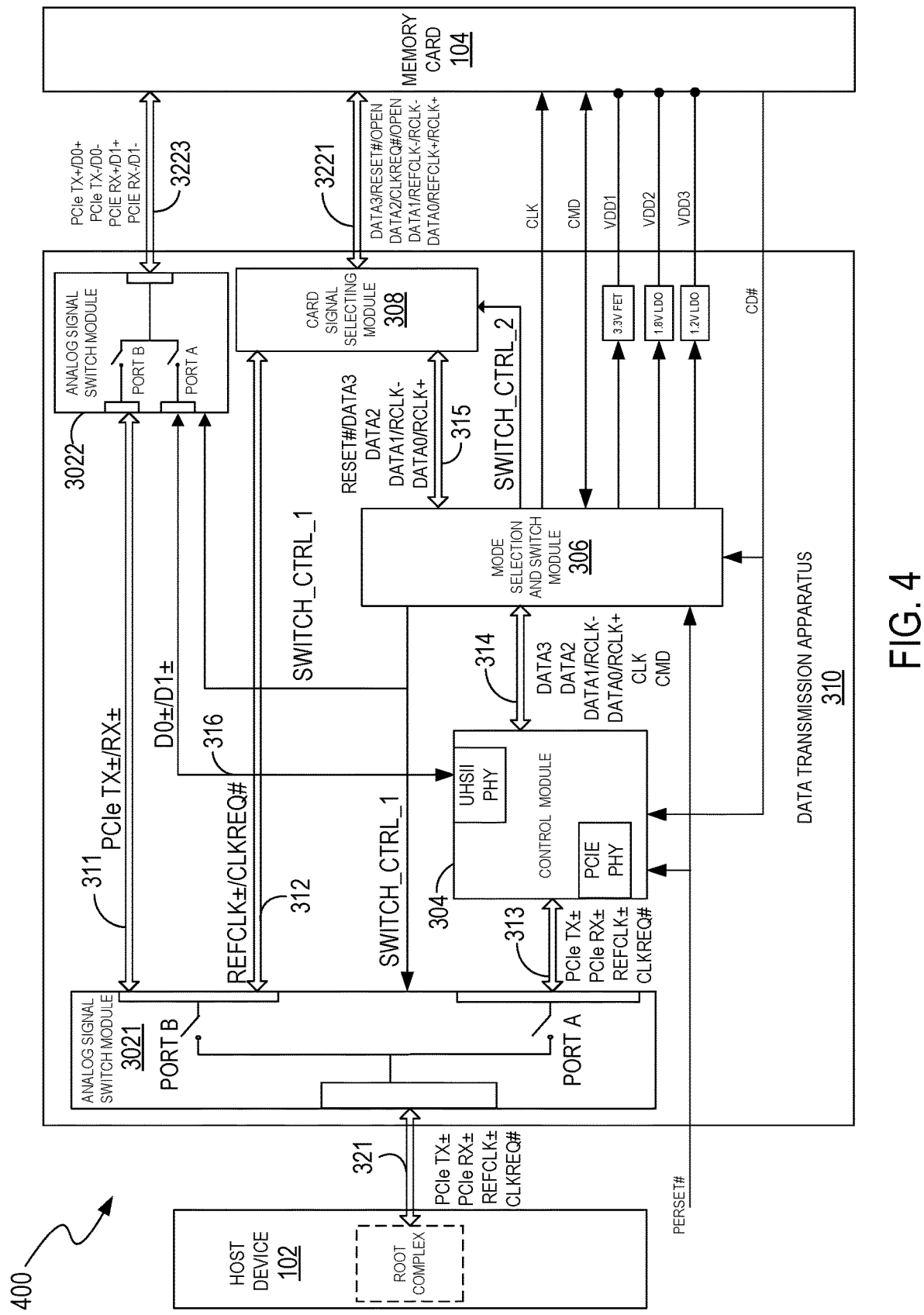
FIG. 4 shows an example of another data transmission system 400 which includes a host device, a data transmission apparatus and a memory card, in accordance with an embodiment of the present invention.

FIG. 4 shows an example of another data transmission system 400 which includes a host device 102, a data transmission apparatus 310 and a memory card 104, in accordance with an embodiment of the present invention. The signals shown in FIG. 4 will be described as below which includes the name and function information.

| No. | Name | Description |
|---|---|---|
| 1 | PERSET# | is used to reset memory card, and defined by PCIE |
| 2 | PCIE TX± | PCIE TX± signal, send differential output |
| 3 | PCIE RX± | PCIE RX± signal, receive differential input |
| 4 | REFCLK+/RCLK+ | reference clock signal |
| 5 | REFCLK−/RCLK− | reference clock signal |

-continued

| No. | Name | Description |
|---|---|---|
| 6 | CLKREQ# | clock request signal |
| 7 | SWITCH_CTRL_1 | the first control signal |
| 8 | CLK | clock signal sent by a control module |
| 9 | CMD | command signal sent by a control module |
| 10 | SWITCH_CTRL_2 | the second control signal |
| 11 | VDD1 | power, 2.7 V-3.6 V |
| 12 | VDD2 | power, 1.7 V-1.95 V |
| 13 | VDD3 | power, 1.14 V-1.30 V |
| 14 | DATA3-DATA0 | data signals |
| 15 | D1±/D0± | data signals |
| 16 | RESET# | reset signal |
| 17 | CD# | card detection signal |

In one embodiment, as shown in FIG. 4, the initial transmission mode of the data transmission apparatus 310 which is set to support the normal transmission mode, but is not limited to, it can be set to support the high-speed transmission mode too, it is just used to describe this invention. First, the control module 304 receives a card detection signal CD# and obtains a low level of the card detection signal CD# when the memory card 104 is inserted, the mode selection and switch module 306 turns on the power VDD1 and provides power VDD1 to the memory card 104. The port A in the analog signal switch module 3021 and the analog signal switch module 3022 are turned on, the card signal selecting module 308 selects a first signal path 315. The port A is also named as the first port. More specifically, the mode selection and switch module 306 sends a first control signal SWITCH_CTRL_1 to the analog signal switch module 3021 and the analog signal switch module 3022 to turn on the port A, and then, the root complex in the host device 102 connects with the control module 304 via the signal path 321 and the signal path 313. At the same time, the mode selection and switch module 306 sends a second control signal SWITCH_CTRL_2 to the card signal selecting module 308 to select the first signal path 315.

Further, the control module 304 sends a clock signal CLK and a command signal CMD to the memory card 104, and the memory card 104 returns a response signal CMD8 (not shown in FIG. 4) to inform the type of the memory card 104. The control module 304 determines if the memory card 104 supports the high-speed transmission mode, and can be powered by power VDD3, for example, the memory card 104 can be powered by a voltage power with 1.2 V. Moreover, the level of the response signal CMD8 will be a low level if the memory card 104 supports the normal transmission mode, for example, SD card: SD3.X-SD6.X. Thus, the data transmission apparatus 310 works in the first transmission mode. Otherwise, the level of the response signal CMD8 will be a high level if the memory card 104 supports the high-speed transmission mode, for example, SD card: SD7.X. In this condition, the control module 304 stops sending a clock signal CLK to the memory card 104 and instructs the mode selection and switch module 306 to turn on power VDD2 or power VDD3 to power the memory card 104. Moreover, the mode selection and switch module 306 sends the first control signal SWITCH_CTRL_1 to the analog signal switch module 3021 and the analog signal switch module 3022 to turn off the port A, and the port B (also called the second port) is turned off too. The host device 102 finds signal loss from the PCIE device (not shown in FIG. 4) in the control module 304 via the PCIE TX+ signal. The root complex in the host device 102 determines whether the PCIE device was decoupled or lost. After a while, the host device 102 uninstalls drive software for the memory card 104 which supports the normal transmission mode, and the host device 102 is reported as hot plug events happened by the root complex. And then, the mode selection and switch module 306 sends the first control signal SWITCH_CTRL_1 to the analog signal switch module 3021 and the analog signal switch module 3022 to turn on the port B. It should be understood by the person having ordinary skill in the art that the steps of turning on the port B are not limited to so. It will be described in detail below.

Further, the mode selection and switch module 306 sends the second control signal SWITCH_CTRL_2 to the card signal selecting module 308, and the card signal selecting module 308 drives a reset signal RESET# to low level. The mode selection and switch module 306 selects the clock request signal CLKREQ# to be transmitted and detects if the memory card 104 has enabled CLKREQ# to low level, and the card signal selecting module 308 selects the second signal path 312 according to the second control signal SWITCH_CTRL_2 when the level of the CLKREQ# signal is low level. While the root complex of the host device 102 determines as hot plug events happened and connects with the memory card 104 via the PCIE path (the signal path 321, the signal path 311 and the signal path 3223). The host device determines that a new PCIE device is inserted and will install Non-Volatile Memory express (NVME) drive. On the contrary, the mode selection and switch module 306 sends the first control signal SWITCH_CTRL_1 to the analog signal switch module 3021 and the analog signal switch module 3022 to turn on port A when the clock request signal CLKREQ# is high level. Meanwhile, the root complex in the host device 102 connects with the control module 304 via the signal path 321, the port A and the signal path 313, and determines as hot plug events happened. The host device 102 determines that a new PCIE device is inserted and installs drive software which supports the normal transmission mode. And the card signal selecting module 308 turns on the first signal path 315 via the second control signal SWITCH_CTRL_2, and the data transmission apparatus 310 works in the normal transmission mode, also called as the first transmission mode.

Further, when the data transmission apparatus 310 works in the first transmission mode, the control module 304 sends the clock signal CLK and a command signal ACMD41 (not shown in FIG. 4) to the memory card 104 wherein the command signal ACMD41 is a standard SD card protocol definition command, then the memory card 104 will return a feedback signal which includes attribute and drive ability of the memory card 104 after receiving the command signal ACMD41, for example, the drive ability of the memory card 104 including the memory card 104 supports UHSI mode or UHSII mode, etc.

Specifically, the control module 304 transmits the data signals DATA3-DATA0 and the reference clock signal RCLK+ to the memory card 104 via the signal path 314, 315 and 3221 when the memory card 104 supports UHSI mode, for example, the memory card 104 is a SD card of SD 3.X type. However, the control module 304 transmits the data signals D1+/D0+ to the memory card 104 via the signal path 316 and 3223 when the memory card 104 supports UHSII mode, and transmits the reference clock signal RCLK+ via the signal path 314, 315 and 3221, for example, the memory card 104 is one of the SD card of SD 4.X-SD6.X type.

In another embodiment, the data transmission apparatus 310 works in the first transmission mode by default when the memory card 104 is inserted. First, the control module 304 stops sending the clock signal CLK to the memory card 104, and provides power VDD1, power VDD2 or power VDD3 to the memory card 104. Second, the mode selection and switch module 306 sends the first control signal SWITCH_CTRL_1 to the analog signal switch module 3021 and the analog signal switch module 3022 to turn off the port A, and the port B (also called second port) is turned off too. Finally, the host device 102 finds signal loss from PCIE device (not shown in FIG. 4) in the control module 304 via the PCIE TX+ signal. The root complex in the host device 102 determines that PCIE device was decoupled or lost. After a while, the host device 102 uninstalls drive software of the memory card which supports the normal transmission mode, and the host device 102 is reported as hot plug events happened by the root complex. And then, the mode selection and switch module 306 sends the first control signal SWITCH_CTRL_1 to the analog signal switch module 3021 and the analog signal switch module 3022 to turn on the port B. Also, the mode selection and switch module 306 sends the second control signal SWITCH_CTRL_2 to the card signal selecting module 308, and the card signal selecting module 308 drives the reset signal RESET# to low level. The mode selection and switch module 306 sends the clock request signal CLKREQ# and detects if the memory card 104 has enabled CLKREQ# to low level, the card signal selecting module 308 selects the second signal path 312 to transmit the reference clock signal REFCLK+ and the clock request signal CLKREQ# via the second control signal SWITCH_CTRL_2 when the level of CLKREQ# is low. While the root complex of the host device 102 determines as hotplug events happened and connects with the memory card 104 via the PCIE path (the signal path 321, the signal path 311 and the signal path 3223). The host device determines that a new PCIE device is inserted and installs a Non-Volatile Memory express (NVME) drive. On the contrary, if the clock request signal CLKREQ# is high level, the mode selection and switch module 306 sends the first control signal SWITCH_CTRL_1 to the analog signal switch module 3021 and the analog signal switch module 3022 to turn on the port A. Meanwhile, the root complex in the host device 102 connects with the control module 304 via the signal path 321, the port A and the signal path 313, and the host device 102 is reported as hotplug events happened. The host device 102 determines that a new PCIE device is inserted and installs drive software for the memory card 104 which supports normal transmission mode. And the card signal selecting module 308 selects the first signal path 315 to transmit the data signals DATA3-DATA0 and the reference clock signal RCLK+ sent from the control module 304 via the second control signal SWITCH_CTRL_2, the data transmission apparatus 310 works in the normal transmission mode, also referred to as the first transmission mode. As disclosed in this embodiment, the data transmission apparatus 310 determines the type of the memory card 104 according to the level of clock request signal CLKREQ# and performs a mode switch between the first transmission mode and the second transmission mode.

In another embodiment, the data transmission apparatus 310 works in the second transmission mode when the memory card satisfies the second condition. The control module 304 in the data transmission apparatus 310 detects if the memory card 104 is decoupled or not according to the card detection signal CD#. Specifically, the host device 102 finds signal loss from PCIE device (not shown in FIG. 4) in the control module 304 via PCIE TX+ signal. The root complex in the host device 102 determines that PCIE device was decoupled or lost. The mode selection and switch module 306 sends the first control signal SWITCH_CTRL_1 to the analog signal switch module 3021 and the analog signal switch module 3022 to turn off the port B, and the port A is turned off too. After a while, the root complex of the host device 102 determines as hot removal events happened, and the host device 102 uninstalls the Non-Volatile Memory express (NVME) drive. The mode selection and switch module 306 sends the first control signal SWITCH_CTRL_1 to the analog signal switch module 3021 and the analog signal switch module 3022 to turns on the port A. Meanwhile, the root complex in the host device 102 connects with the control module 304 via the signal path 321, the port A and the signal path 313, and the host device is reported as hotplug events happened. The host device 102 determines that a new PCIE device is inserted and installs drive software for the memory card 104 which supports normal transmission mode. And the card signal selecting module 308 selects the first signal path 315 to transmit the data signals DATA3-DATA0 and the reference clock signal RCLK+ sent from the control module 304 via the second control signal SWITCH_CTRL_2, and turns off the power VDD2 or power VDD3.

As embodiment disclosed above, the data transmission apparatus 310 which works in the first transmission mode by default or works in the second transmission mode by default is not the limitation of this invention.

Figure 5:
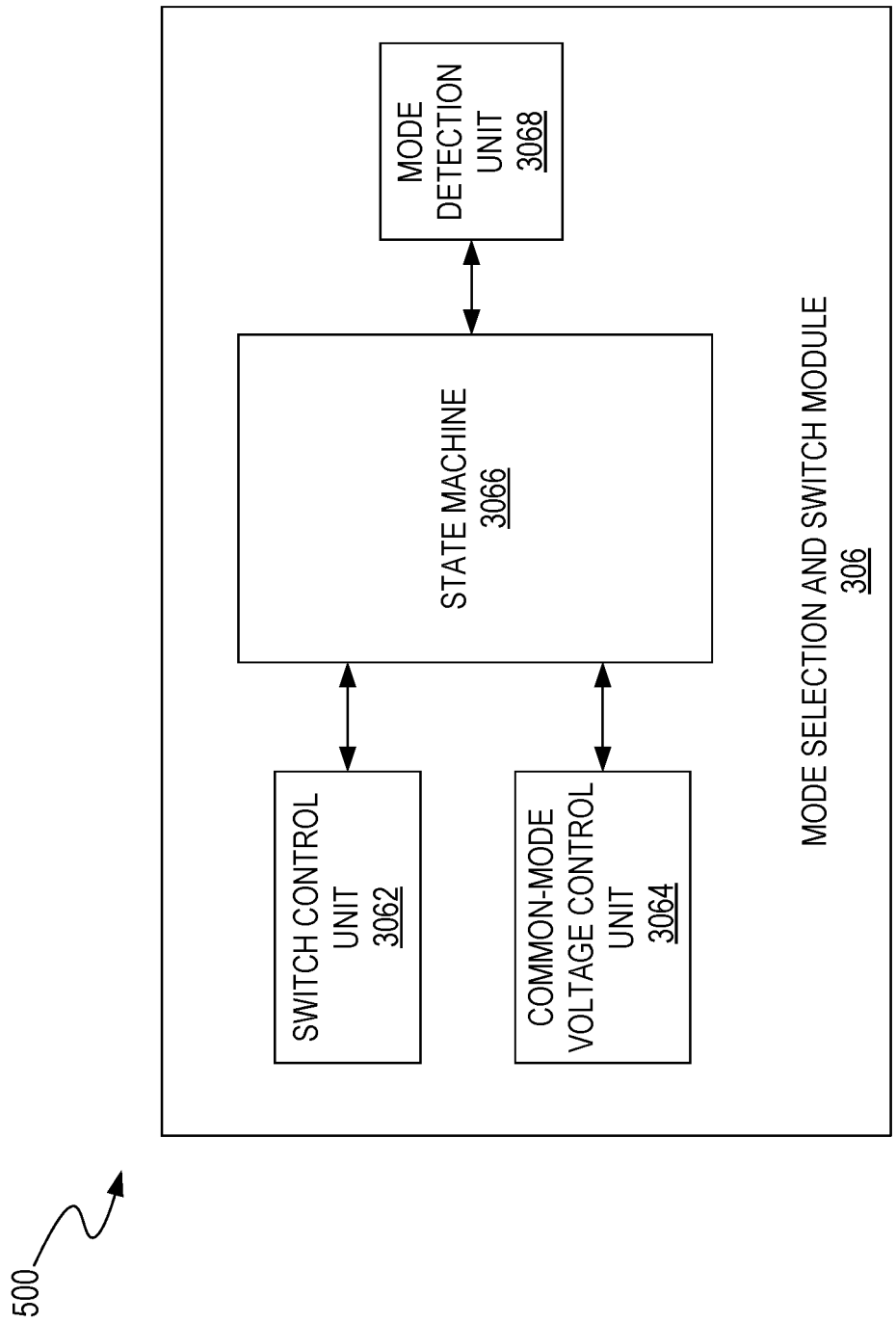
FIG. 5 shows an example of a mode selection and switch module 306 in the data transmission apparatus 310 shown in FIG. 3, in accordance with an embodiment of the present invention.

FIG. 5 shows an example of a mode selection and switch module 306 in the data transmission apparatus 310 shown in FIG. 3, in accordance with an embodiment of the present invention. As shown in FIG. 5, the mode selection and switch module 306 includes a switch control unit 3062, a common-mode voltage control unit 3064, a state machine 3066 and a mode detection unit 3068. The switch control unit 3062 is configured to generate a first control signal SWITCH_CTRL_1 to turn on/off the port A or the port B in the analog signal switch module 3021 and the analog signal switch module 3022 and generates a second control signal SWITCH_CTRL_2 to control the signal path 312 or the signal path 315.

The common-mode voltage control unit 3064 is configured to output different common-mode voltage levels according to different kinds of memory cards 104. In one embodiment, the data transmission apparatus 310 configures a parameter configuration register to set different kinds of parameters to control the common-mode voltage.

The state machine 3066 is configured to receive external signals and monitor the state of the port A or the port B in the analog signal switch module 3021, the analog signal switch module 3022 and the state of the switch (not shown in FIG. 4) in the card signal selecting module 308. That is, the state machine 3066 records and stores the state of the analog signal switch module 3021, the analog signal switch module 3022 and the card signal selecting module 308, including the states of the port A, the port B, the signal path 312 and the signal path 315. The mode detection unit 3068 is configured to determine the type of the memory card 104 according to the response signal CMD8.

Figure 6:
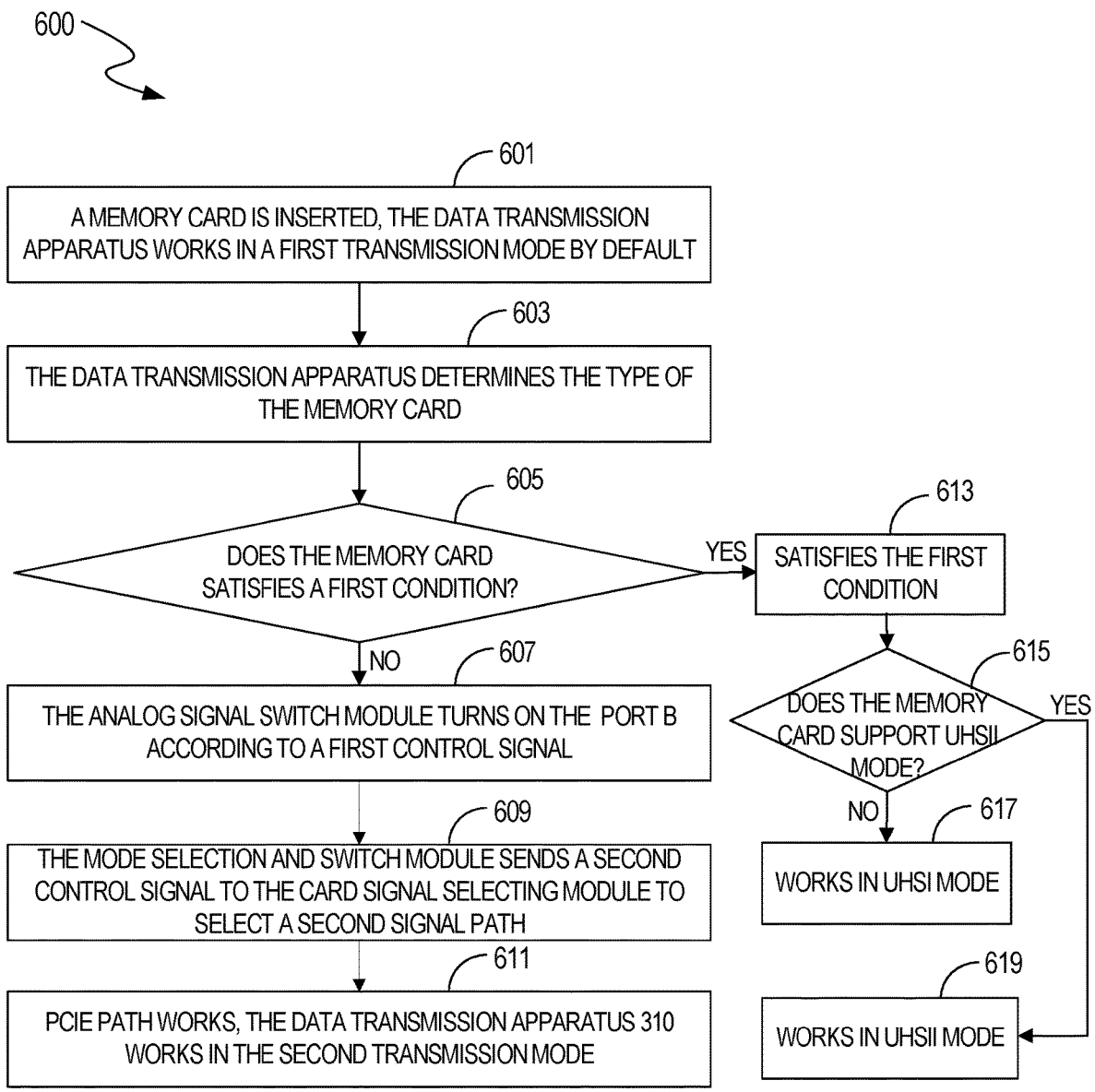
FIG. 6 shows a flowchart of an example of a data transmission method for providing communication between a host device and a memory card, in accordance with an embodiment of the present invention.

FIG. 6 shows a flowchart of an example of a data transmission method 600 for providing communication between a host device and a memory card, in accordance with an embodiment of the present invention. FIG. 6 is described in combination with FIG. 3 and FIG. 4. Although specific steps are disclosed in FIG. 6, such steps are examples. That is, the present invention is well suited to perform various other steps or variations of the steps recited in FIG. 6. As shown in FIG. 6, the data transmission method 600 includes steps 601-619 as below:

At step 601: a memory card 104 is inserted into a card slot in the host device 102, for example, a SD card of SD3.X-SD7.X type. The data transmission apparatus 310 works in a first transmission mode by default.

At step 603: The data transmission apparatus 310 determines the type of the memory card 104. The details of steps can refer to the description of FIG. 4. The control module 304 sends a command signal CMD to the memory card 104, and the memory card 104 returns a response signal CMD8 to inform the type of the memory card 104. For example, the memory card 104 supports a first transmission mode when the level of the response signal CMD8 is low level; otherwise, the memory card 104 supports a second transmission mode.

At step 605: the data transmission apparatus 310 determines if the memory card 104 satisfies a first condition, if it is, performs step 613.

At step 607: the mode selection and switch module 306 sends a first control signal SWITCH_CTRL_1 to the analog signal switch module 3021 and the analog signal switch module 3022 to turn on the port B if the memory card 104 satisfies a second condition.

At step 609: the mode selection and switch module 306 sends a second control signal SWITCH_CTRL_2 to the card signal selecting module 308 to control the second signal path 312.

At step 611: PCIE paths connection succeed, the host device 102 connects with the memory card 104 via signal paths 321, 311, 312, 3221 and 3223. The data transmission apparatus 310 works in the second transmission mode.

At step 613: The data transmission apparatus 310 satisfies the first transmission mode.

At step 615: The data transmission apparatus 310 detects if the memory card 104 supports UHSII mode, if it is, performs step 619, if not, performs step 617.

At step 617: The data transmission apparatus 310 works in UHSI mode.

At step 619: The data transmission apparatus 310 works in UHSII mode.

Specifically, the data transmission method shown above is performed by each module within the data transmission apparatus 310. The mode selection and switch module 306 sends a first control signal SWITCH_CTRL_1 to the analog signal switch module 3021 and the analog signal switch module 3022 to turn on the port A or the port B. Also, the mode selection and switch module 306 sends a second control signal SWITCH_CTRL_2 to the card signal selecting module 308 to control selecting of a first signal path 315 or a second signal path 312. The first condition includes the memory card 104 supporting the transmission characters of SD3.X-SD6.X, the first transmission mode is referred to as the normal transmission mode too; the second condition includes the memory card 104 supporting the transmission characters of SD7.X, the second transmission mode is referred to as the high-speed transmission mode too.

Figure 7:
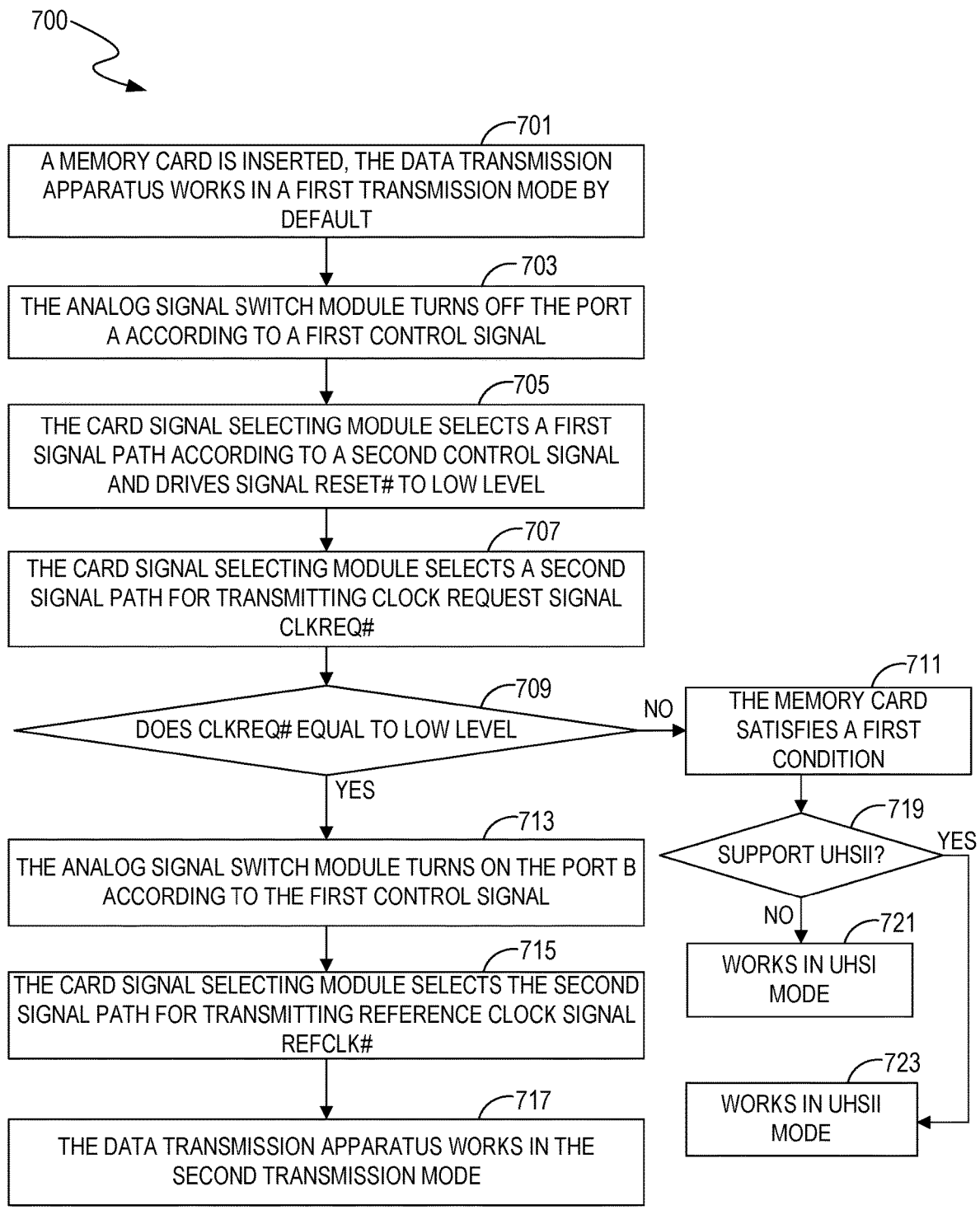
FIG. 7 shows another flowchart of an example of a data transmission method for providing communication between a host device and a memory card, in accordance with an embodiment of the present invention.

FIG. 7 shows another flowchart of an example of a data transmission method 700 for providing communication between a host device 102 and a memory card 104, in accordance with an embodiment of the present invention. FIG. 7 is described in combination with FIG. 3 and FIG. 4. Although specific steps are disclosed in FIG. 7, such steps are examples. That is, the present invention is well suited to perform various other steps or variations of the steps recited in FIG. 7. As shown in FIG. 7, the data transmission method 700 includes steps 701-723 as below.

At step 701: a memory card 104 is inserted into a card slot in the host device 102, for example, a memory card of SD3.X-SD7.X type. The data transmission apparatus 310 works in a first transmission mode by default.

At step 703: the analog signal switch module 3021 and the analog signal switch module 3022 turn off the port A according to the first control signal SWITCH_CTRL_1 sent from the mode selection and switch module 306.

At step 705: the mode selection and switch module 306 sends a second control signal SWITCH_CTRL_2 to the card signal selecting module 308 to control a first signal path 315, and the card signal selecting module 308 drives a reset signal RESET# to low level.

At step 707: the card signal selecting module 308 selects the second signal path 312 for transmitting a clock request signal CLKREQ#.

At step 709: the mode selection and switch module 306 detects if the memory card 104 has enabled the clock request signal CLKREQ# to low level. If it is, performs step 713, if not, performs step 711.

At step 711: the level of the clock request signal CLKREQ# is high level. The data transmission apparatus 310 determines that the memory card 104 supports the first transmission mode, or the memory card satisfies the first condition. The mode selection and switch module 306 sends the first control signal SWITCH_CTRL_1 to the analog signal switch module 3021 and the analog signal switch module 3022 to turn on the port A, the card signal selecting module 308 selects the first signal path 315 via the second control signal SWITCH_CTRL_2.

At step 713: the level of the clock request signal CLKREQ# is low level. The data transmission apparatus 310 determines that the memory card 104 supports the second transmission mode, or the memory card 104 satisfies the second condition. The mode selection and switch module 306 sends the first control signal SWITCH_CTRL_1 to the analog signal switch module 3021 and the analog signal switch module 3022 to turn on the port B.

At step 715: the card signal selecting module 308 selects the second signal path 312 for transmitting reference clock signal REFCLK+ according to the second control signal. The root complex of the host device 102 determines as hotplug events happened and connects with the memory card 104 via PCIE path (the signal path 321, the signal path 311 and the signal path 3223). The host device determines that a new PCIE device is inserted and installs Non-Volatile Memory express (NVME) drive.

At step 717: The data transmission apparatus 310 works in the second transmission mode, the memory card 104 satisfies the second condition.

At step 719: The data transmission apparatus 310 detects if the memory card 104 supports UHSII mode, if it is, performs step 723, if not, performs step 721.

At step 721: The data transmission apparatus 310 works in UHSI mode.

At step 723: The data transmission apparatus 310 works in UHSII mode.

Figure 8:
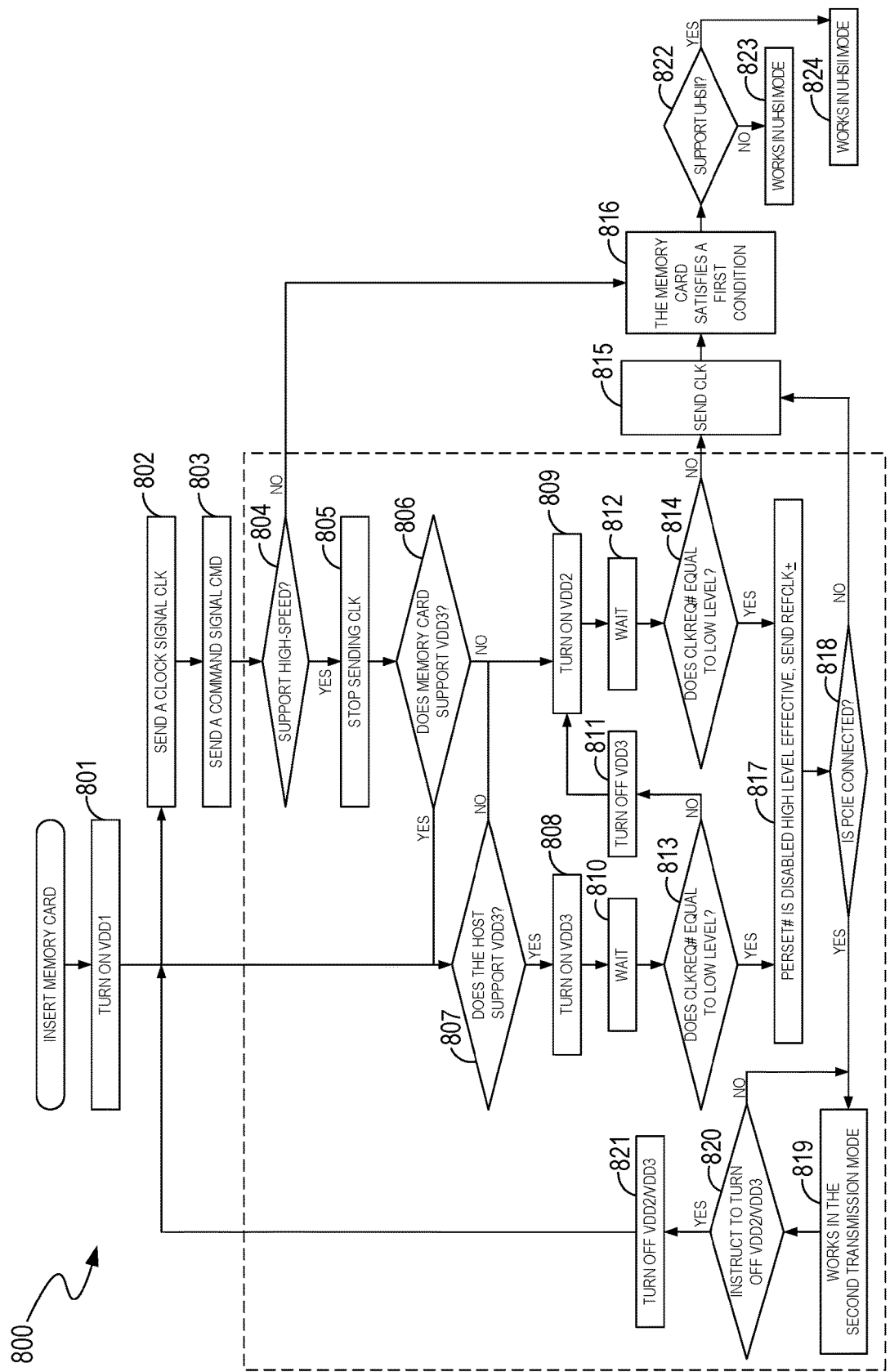
FIG. 8 shows another flowchart of an example of a data transmission method for providing communication between a host device and a memory card, in accordance with an embodiment of the present invention.

FIG. 8 shows another flowchart of an example of a data transmission method 800 for providing communication between a host device 102 and a memory card 104, in accordance with an embodiment of the present invention. FIG. 8 is described in combination with FIG. 4. Although specific steps are disclosed in FIG. 8, such steps are examples. That is, the present invention is well suited to perform various other steps or variations of the steps recited in FIG. 8. As shown in FIG. 8, the data transmission method 800 performed by the data transmission apparatus 310 includes steps 801-824 as below:

At step 801: the mode selection and switch module 306 in the data transmission apparatus 310 turns on the power VDD1 and provides power VDD1 to the memory card 104 when the memory card 104 is inserted into the host device 102.

At step 802: the control module 304 in the data transmission apparatus 310 sends a clock signal CLK to the memory card 104.

At step 803: the control module 304 sends a command signal CMD to the memory card 104. The memory card 104 returns a response signal CMD8 to the control module 304 after receiving the command signal CMD. The control module 304 determines the type of the memory card 104, for example, the memory card 104 satisfies a first condition, e.g. is of SD3.X-SD6.X type; or the memory card 104 satisfies a second condition, e.g. is of SD7.X type.

At step 804: the control module 304 detects if the memory card 104 supports the high-speed transmission mode. If it is, performs step 805; if not, performs step 816.

At step 805: the control module 304 stops sending the clock signal CLK to the memory card 104.

At step 806: the mode selection and switch module 306 detects if the memory card 104 supports power VDD3. If it is, performs step 807; if not, performs step 809.

At step 807: the control module 304 detects if the host device 102 supports power VDD3, if it is, the mode selection and switch module 306 provides power VDD3 to the memory card 104; if not, performs step 809.

At step 808: the mode selection and switch module 306 turns on power VDD3, performs step 810.

At step 809: the mode selection and switch module 306 provides power VDD2 to the memory card 104, and performs step 812.

At step 810: the control module 304 gets into a waiting state and waits for a predetermined period of time and performs 813.

At step 811: the mode selection and switch module 306 turns off power VDD3, performs step 809.

At step 812: the control module 304 gets into a waiting state and waits for a predetermined period of time after the mode selection and switch module 306 provides power VDD2 to the memory card 104, performs step 814.

At step 813: the mode selection and switch module 306 detects if the level of the clock response signal CLKREQ# returned from the memory card 104 is low level. If it is, performs step 817; if not, performs step 811.

At step 814: the mode selection and switch module 306 detects if the level of the clock response signal CLKREQ# returned from the memory card 104 is low level. If it is, performs step 817; if not, performs step 815.

At step 816: the data transmission apparatus 310 satisfies the first transmission mode, the memory card 104 satisfies a first condition.

At step 817: the signal PERSET# which is used to reset the memory card 104 is disabled high level effective by the mode selection and switch module 306. The data transmission apparatus 310 sends a reference signal REFCLK+ to the memory card 104 and performs step 818.

At step 818: the data transmission apparatus detects if the PCIE path connection succeed or not, i.e., the second signal path 312 and the signal path 311 are selected or not, if it is, performs step 819; if not, performs step 815.

At step 819: the data transmission apparatus 310 works in the second transmission mode, performs step 820.

At step 820: the data transmission apparatus 310 detects if receiving a command to turn off the power VDD2 and/or power VDD3. If it is, performs 821; if not, performs 819.

At step 821: the mode selection and switch module 306 turns off power VDD2 and power VDD3, performs step 802.

At step 822: The data transmission apparatus 310 detects if the memory card 104 supports UHSII mode, if it is, performs step 824, if not, performs step 823.

At step 823: The data transmission apparatus 310 works in UHSI mode.

At step 824: The data transmission apparatus 310 works in UHSII mode.

It should be understood by the person having ordinary skill in the art, although specific steps are disclosed in FIG. 6, FIG. 7 and FIG. 8, such steps are examples. That is, the present invention is well suited to perform various other steps or variations of the steps recited in FIG. 6, FIG. 7 and FIG. 8.

Furthermore, the data transmission apparatus 310 includes different kinds of working states when the memory card 104 is decoupled, for example, the first working state: the host device 102 shows transmission chip and device driver when the data transmission apparatus 310 stands in a no-load condition; the second working state: the PCIE path is disconnected, i.e., the root complex in the host device 102 disconnects with the control module 304 and the memory card 104; the third working state: the data transmission apparatus 310 stays in the working state before the memory card 104 is decoupled. That is, the data transmission apparatus 310 stays in the first transmission mode if the memory card which is decoupled satisfies a first condition, while the root complex in the host device 102 maintains connection with the control module 304. Otherwise, the root complex in the host device 102 keeps connecting with the port B and the port B is turned on if the memory card which is decoupled satisfies a second condition, and the data transmission apparatus 310 works in the second transmission mode. The working states above mentioned have the shortcoming of time-consuming, and the data transmission apparatus 310 cannot show device driver in condition of hot-insertion and removal.

Figure 9:
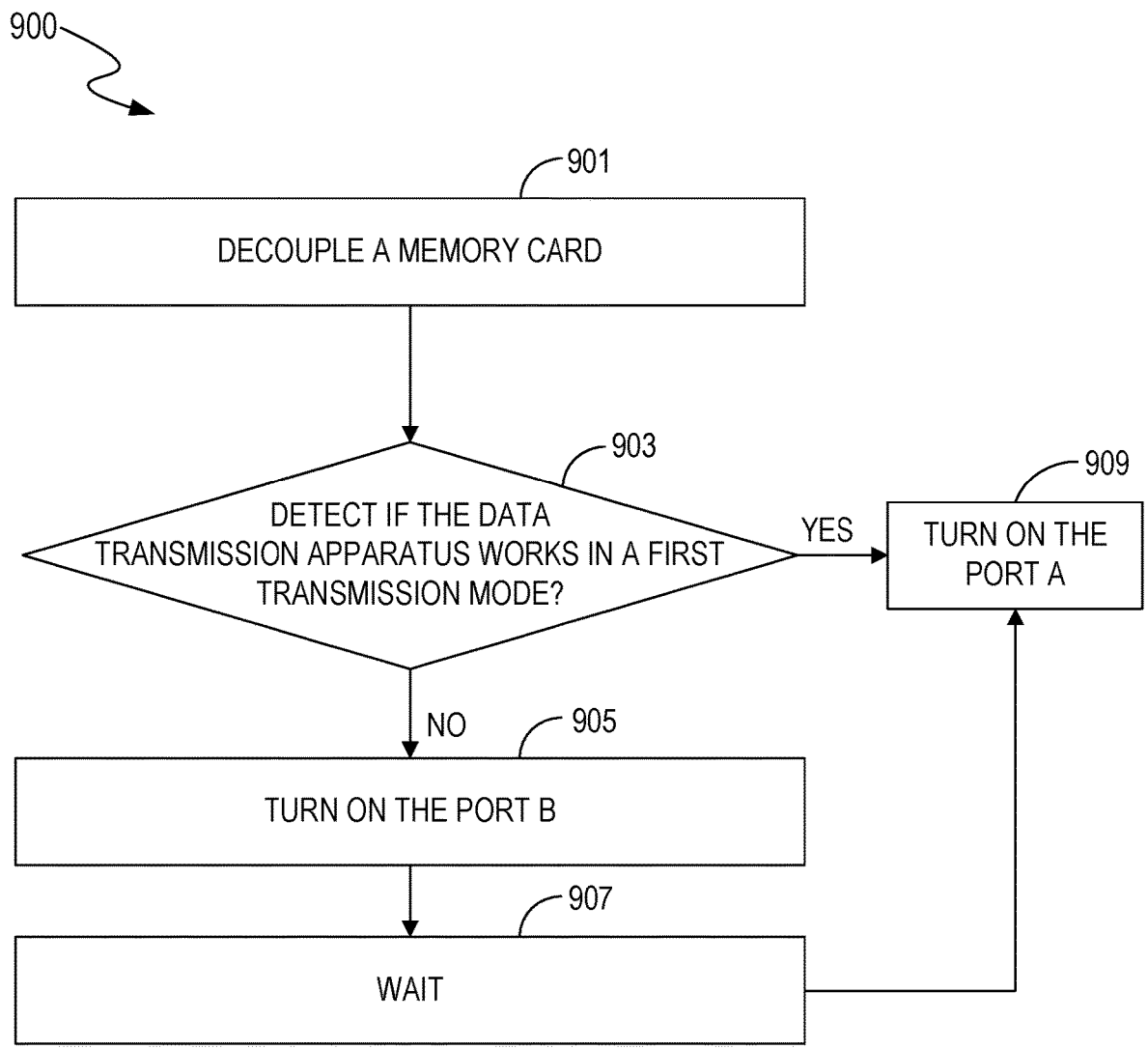
FIG. 9 shows a flowchart of an example of a method for switching signal path, in accordance with an embodiment of the present invention.

FIG. 9 shows a flowchart of an example of a method for switching signal path 900, in accordance with an embodiment of the present invention. FIG. 9 shows a flowchart of switching signal path when the data transmission apparatus 310 stands in no-load condition. FIG. 9 is described in combination with FIG. 4-FIG. 8. As shown in FIG. 9, after decoupling the memory card 104, the method for switching signal path includes steps 901-909.

At step 901: the memory card 104 is decoupled.

At step 903: the data transmission apparatus 310 determines the working state of the data transmission apparatus 310 before the memory card 104 is decoupled, and detects if the data transmission apparatus 310 works in a first transmission mode, if it is, performs step 909; if not, performs step 905.

At step 905: port B in an analog signal switch module 3021 and an analog signal switch module 3022 keeps turning on.

At step 907: wait a period a time before the root complex in the host device 102 disconnect with the port B.

At step 909: the root complex in the host device 102 connects with the control module 304, and the analog signal switch module 3021 and the analog signal switch module 3022 turn on the port A.

The data transmission apparatus 310 saves time of installing and/or uninstalling time of drive software for the memory card 104 when the data transmission apparatus 310 is triggered by insertion of the memory card 104, in accordance with an embodiment of the present invention.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which is particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A data transmission apparatus for providing communication between a memory card and a host device, said data transmission apparatus comprising:
   a control module configured to receive signals from said host device via a first port if said first port is turned on;
   a card signal selecting module configured to receive signals from said host device via a second port if said second port is turned on; and
   a mode selection and switch module, coupled to said control module and said card signal selecting module, and configured to control said first and second ports and control a first signal path and a second signal path according to a condition said memory card satisfies,
   wherein said first signal path is configured to connect said control module and said card signal selecting module to implement signal transmission between said control module and said card signal selecting module,
   wherein said second signal path is configured to connect said host device and said card signal selecting module so that said host device transmits signals to said card signal selecting module via said second signal path,
   wherein when said memory card satisfies a first condition, said data transmission apparatus works in a first transmission mode,
   wherein in said first transmission mode, said mode selection and switch module selects said first port to be turned on and selects said first signal path to transmit signals, and said data transmission apparatus connects said host device and said memory card via said first port and said first signal path,
   wherein when said memory card satisfies a second condition, said data transmission apparatus works in a second transmission mode, and
   wherein in said second transmission mode, said mode selection and switch module selects said second port to be turned on and selects said second signal path to transmit signals, and said data transmission apparatus connects said host device and said memory card via said second port and said second signal path.

2. The data transmission apparatus of claim 1, wherein said mode selection and switch module comprises:
   a switch control unit configured to generate a first control signal to control said first and second ports and generate a second control signal to control said first and second signal paths;
   a voltage control unit configured to output a common mode voltage according to a type of said memory card;
   a state machine configured to receive signals transmitted in said data transmission apparatus; and
   a mode detection unit configured to detect said type of said memory card.

3. The data transmission apparatus of claim 1, wherein said control module is configured to determine a type of said memory card by determining whether said memory card satisfies said first condition or said second condition according to a response signal provided from said memory card to said control module.

4. The data transmission apparatus of claim 3, wherein prior to determining said type of said memory card, said control module is further configured to receive a card detection signal sent from said memory card and detects insertion of said memory card.

5. The data transmission apparatus of claim 1, wherein said memory card satisfies said first condition if said memory card is a type of memory card selected from the group consisting of SD3.X, SD4.X, SD5.X and SD6.X, and
   wherein said memory card satisfies said second condition if the type of said memory card is SD7.X.

6. The data transmission apparatus of claim 1, wherein said card signal selecting module connects with said memory card via a third signal path and selects said first signal path or said second signal path to be turned on according to said condition said memory card satisfies,
   wherein said first signal path connects to said third signal path to transmit data signals, a reset signal, and a reference clock signal in response to said memory card satisfying said first condition, and
   wherein said second signal path connects to said third signal path to transmit a reference clock signal and a clock request signal in response to said memory card satisfying said second condition.

7. The data transmission apparatus of claim 1, further comprising:
   a first analog signal switch module, comprising said first port and said second port, coupled to said control module via said first port, and coupled to said card signal selecting module via said second port; and
   a second analog signal switch module coupled to said first analog signal switch module via a third signal path and said second port, and coupled to said control module via a fourth signal path.

8. The data transmission apparatus of claim 7, wherein said first port is configured to transmit signals between said host device and said control module when said first port is tuned on,
   wherein said host device transmits, to said memory card, a first part of signals between said host device and said memory card via said second signal path when said second port is turned on,
   wherein said host device transmits, to said memory card, a second part of said signals between said host device and said memory card via said third signal path when said second port is turned on, and
   wherein said second part comprises a TX signal and an RX signal.

9. The data transmission apparatus of claim 7, wherein said first transmission mode comprises a UHSII mode and a UHSI mode,
   wherein if said memory card supports said UHSII mode, said control module transmits data signals to said memory card via said fourth signal path and transmits a reference clock signal to said memory card via said first signal path, and
   wherein if said memory card supports said UHSI mode, said control module transmits data signals and a reference clock signal to said memory card via said first signal path.

10. A method for providing communication between a host device and a memory card, comprising:
   determining a condition said memory card satisfies, using a data transmission apparatus coupled between said host device and said memory card, wherein data transmission apparatus comprises a control module coupled to said host device via a first port, and a card signal selecting module coupled to said host device via a second port, and wherein said card signal selecting module is coupled to said control module via a first signal path and coupled to said second port via a second signal path;
   in response to said memory card satisfying a first condition, controlling said data transmission apparatus to work in a first transmission mode;
   in said first transmission mode, selecting said first port to be turned on and selecting said first signal path to transmit signals so that said data transmission apparatus connects said host device and said memory card via said first port and said first signal path;
   in response to said memory card satisfying a second condition, controlling said data transmission apparatus to work in a second transmission mode; and
   in said second transmission mode, selecting said second port to be turned on and selecting said second signal path to transmit signals so that said data transmission apparatus connects said host device and said memory card via said second port and said second signal path.

11. The method of claim 10, further comprising:
   receiving, by said control module, a response signal from said memory card; and
   determining whether said memory card satisfies said first condition or said second condition according to said response signal thereby determining a type of said memory card.

12. The method of claim 10, wherein said memory card satisfies said first condition if said memory card is a type of memory card selected from the group consisting of SD3.X, SD4.X, SD5.X and SD6.X, and
   wherein said memory card satisfies said second condition if the type of said memory card is SD7.X.

13. The method of claim 10, further comprising:
   in said first transmission mode, transmitting, by said data transmission apparatus, data signals, a reset signal, and a reference clock signal to said memory card via said first signal path;
   in said second transmission mode, transmitting, by said host device, a reference clock signal and a clock request signal via said second signal path; and
   in said second transmission mode, transmitting, by said host device, a TX signal and an RX signal to said memory card via a third signal path, wherein said third signal path belongs to a peripheral component interconnect express (PCIE) bus.

14. The method of claim 10, wherein said data transmission apparatus comprises:
a first analog signal switch module, comprising said first and second ports, coupled to said control module via said first port, and coupled to said card signal selecting module via said second port; and
a second analog signal switch module coupled to said first analog signal switch module via a third signal path and said second port, and coupled to said control module via a fourth signal path.

15. The method of claim 14, further comprising:
transmitting signals between said host device and said control module via said first port when said first port is turned on;
transmitting a first part of signals between said host device and said memory card via said second signal path when said second port is turned on; and
transmitting a second part of said signals between said host device and said memory card via said third signal path when said second port is turned on, wherein said second part comprises a TX signal and an RX signal.

16. The method of claim 14, wherein said first transmission mode comprises a UHSII mode and a UHSI mode, and wherein said method further comprises:
if said memory card supports said UHSII mode, transmitting data signals to said memory card via said fourth signal path and transmitting a reference clock signal to said memory card via said first signal path; and
if said memory card supports said UHSI mode, transmitting data signals and a reference clock signal to said memory card via said first signal path.

17. A data transmission system comprising:
a host device; and
a data transmission apparatus coupled to said host device, and configured to provide communication between said host device and a memory card, said data transmission apparatus comprising:
a control module configured to receive signals from said host device via a first port if said first port is turned on;
a card signal selecting module configured to receive signals from said host device via a second port if said second port is turned on; and
a mode selection and switch module, coupled to said control module and said card signal selecting module, and configured to control said first and second ports and control a first signal path and a second signal path according to a condition said memory card satisfies,
wherein said first signal path is configured to connect said control module and said card signal selecting module to implement signal transmission between said control module and said card signal selecting module,
wherein said second signal path is configured to connect said host device and said card signal selecting module so that said host device transmits signals to said card signal selecting module via said second signal path,
wherein when said memory card satisfies a first condition, said data transmission apparatus works in a first transmission mode,
wherein in said first transmission mode, said mode selection and switch module selects said first port to be turned on and selects said first signal path to transmit signals, and said data transmission apparatus connects said host device and said memory card via said first port and said first signal path,
wherein when said memory card satisfies a second condition, said data transmission apparatus works in a second transmission mode, and
wherein in said second transmission mode, said mode selection and switch module selects said second port to be turned on and selects said second signal path to transmit signals, and said data transmission apparatus connects said host device and said memory card via said second port and said second signal path.

18. The data transmission system of claim 17, wherein in said first transmission mode, said data transmission apparatus transmits data signals, a reset signal, and a reference clock signal to said memory card via said first signal path,
wherein in said second transmission mode, said host device transmits a reference clock signal and a clock request signal via said second signal path, and
wherein in said second transmission mode, said host device transmits a TX signal and an RX signal to said memory card via a third signal path, wherein said third signal path belongs to a peripheral component interconnect express (PCIE) bus.

19. The data transmission system of claim 17, wherein said first port is configured to transmit signals between said host device and said control module when said first port is tuned on,
wherein said host device transmits, to said memory card, a first part of signals between said host device and said memory card via said second signal path when said second port is turned on,
wherein said host device transmits, to said memory card, a second part of said signals between said host device and said memory card via a third signal path when said second port is turned on, and
wherein said second part comprises a TX signal and an RX signal.

20. The data transmission system of claim 17, wherein said first transmission mode comprises a UHSII mode and a UHSI mode,
wherein if said memory card supports said UHSII mode, said control module transmits data signals to said memory card via a third signal path and transmits a reference clock signal to said memory card via said first signal path, and
wherein if said memory card supports said UHSI mode, said control module transmits data signals and a reference clock signal to said memory card via said first signal path.

* * * * *